United States Patent [19]

Dobransky et al.

[11] 3,727,859

[45] Apr. 17, 1973

[54] MEANS FOR EQUALIZING THE LOADING CHARACTERISTICS OF VACUUM COLUMNS

[75] Inventors: Robert P. Dobransky; Frederick B. Froehlich, both of Boulder; Bernard J. Halter, Longmont; William H. Middleton, Boulder, all of Colo.

[73] Assignee: International Business Machines Corporation, Armonk, N.Y.

[22] Filed: June 7, 1971

[21] Appl. No.: 150,321

[52] U.S. Cl. ....................................................242/182

[51] Int. Cl. ..........................G11b 15/58, G11b 23/12

[58] Field of Search ......................242/182, 183, 184, 242/185; 226/95, 97, 118; 179/100.2 P

[56] References Cited

UNITED STATES PATENTS

| | | | |
|---|---|---|---|
| 3,507,432 | 4/1970 | Fecher et al. | 242/185 |
| 3,627,226 | 12/1971 | Setter | 242/185 |
| 3,645,470 | 2/1972 | Dickinson | 242/182 |

*Primary Examiner*—Louis R. Prince
*Assistant Examiner*—John M. Jillions
*Attorney*—Hanifin and Jancin and Francis A. Sirr

[57] ABSTRACT

A magnetic tape unit having two vacuum column tape loop buffers, with a machine reel and a removable file reel disposed to selectively supply tape to or receive tape from one of the columns, and a single capstan located between the columns to control the tape movement. A tape processing station is mounted at a fixed position adjacent the upper portion of a narrow wall of the machine column. The lower portion of each column defines an operational zone and includes a capacitance-type loop position sensor whose output signal servo-controls the reel motors in accordance with the position of the tape loop bight within the zone. The upper portion of at least one of the columns includes air flow leakage means constructed and arranged to compensate for air leakage which occurs as the tape loop passes the processing station during loading of the tape loops into the columns, this controlled air leakage producing concurrent loading of the columns.

12 Claims, 9 Drawing Figures

MEANS FOR EQUALIZING THE LOADING CHARACTERISTICS OF VACUUM COLUMNS

BACKGROUND AND SUMMARY OF THE INVENTION

This invention relates to the field of winding and reeling of web-like material by the use of low inertia vacuum chambers or bins. More particularly, this invention relates to means for concurrently loading a loop of tape into each of a plurality of vacuum chambers, where the chambers have inherent dissimilar loading characteristics.

While the present invention finds utility in the general field of web transport, it will be described in the environment of magnetic tape transport, without limitation thereto.

The prior art contains detailed teachings of the advantages realized by using vacuum columns to isolate a low inertia capstan from high inertia reels. These columns may be of varying length and are formed by four walls. Two parallel walls are relatively wide and establish the width of the tape loop. The other two parallel walls are relatively narrow and are of a width approximately equal to the width of the tape to be processed, for example one-half inch. The loop of tape in the column seals the column such that the column above the loop bight is at atmospheric pressure and the column below the bight is at vacuum, or less than atmospheric pressure. Loop position sensing devices, such as pressure sensitive switches, pressure sensitive capacitors, photocells and the like, are positioned along at least a portion of each column to define an operational zone. During movement of the tape by the capstan, these sensing devices detect movement of the tape bight and servo-control an associated reel motor to maintain the bight in the operational zone.

When a reel or cartridge of tape is initially placed on the tape unit, a loop of tape must be loading into each column before the tape unit can be considered ready to process tape. Usually, it is desirable to concurrently load the columns. The detection of vacuum under the loop bight of each column is used to indicate that the columns have been successfully loaded.

Prior art is known where the front face of the vacuum columns include equal size holes to facilitate loading of the column by manually covering the holes, or to provide short-loop sensing when the loop rises above the holes.

The present invention relates to the concurrent loading of vacuum columns which have inherent dissimilar loading characteristics. By way of example, dissimilar loading characteristics may result from the presence of an object, such as a tape processing station (elements such as the head, the tape cleaner and the EOT/BOT detector assembly), in a wall of one or more of the columns at a position adjacent the open loading end of the column. As the loop bights are drawn into the columns by vacuum force, those loops associated with such columns break away from the walls of the columns, the seal is partially lost and the loading force decreases, causing the other columns to load before these columns load.

The essence of the present invention is the provision of leakage means to equalize the loading characteristics of the columns.

The preferred embodiment of the present invention discloses a two-column magnetic tape unit. One column has unobstructed walls and the loop in this column remains sealed as it is loaded into the operational zone. The other column includes an obstruction in a narrow wall thereof in the portion of the column which is between the loading opening and the operational zone. Air leakage means of the present invention provides leakage into at least said one column to equalize the loading characteristics of the two columns. This leakage means is located so that is is functionally ineffective once the tape loop has entered the operational zone.

More specifically, each of the two columns is constructed and arranged in accordance with the present invention to provide leakage into each column, the total leakage of each column, including that leakage which occurs as the loop passes the obstruction in said other column, being substantially equal. This last mentioned feature of the present invention has particular utility where a pressure sensitive switch responds to vacuum force under the loop bight to indicate that a column has been successfully loaded.

The foregoing and other features and advantages of the invention will be apparent from the following more particular description of the preferred embodiments of the invention, as illustrated in the accompanying drawings.

DESCRIPTION OF THE PREFERRED EMBODIMENTS

Figure 1:
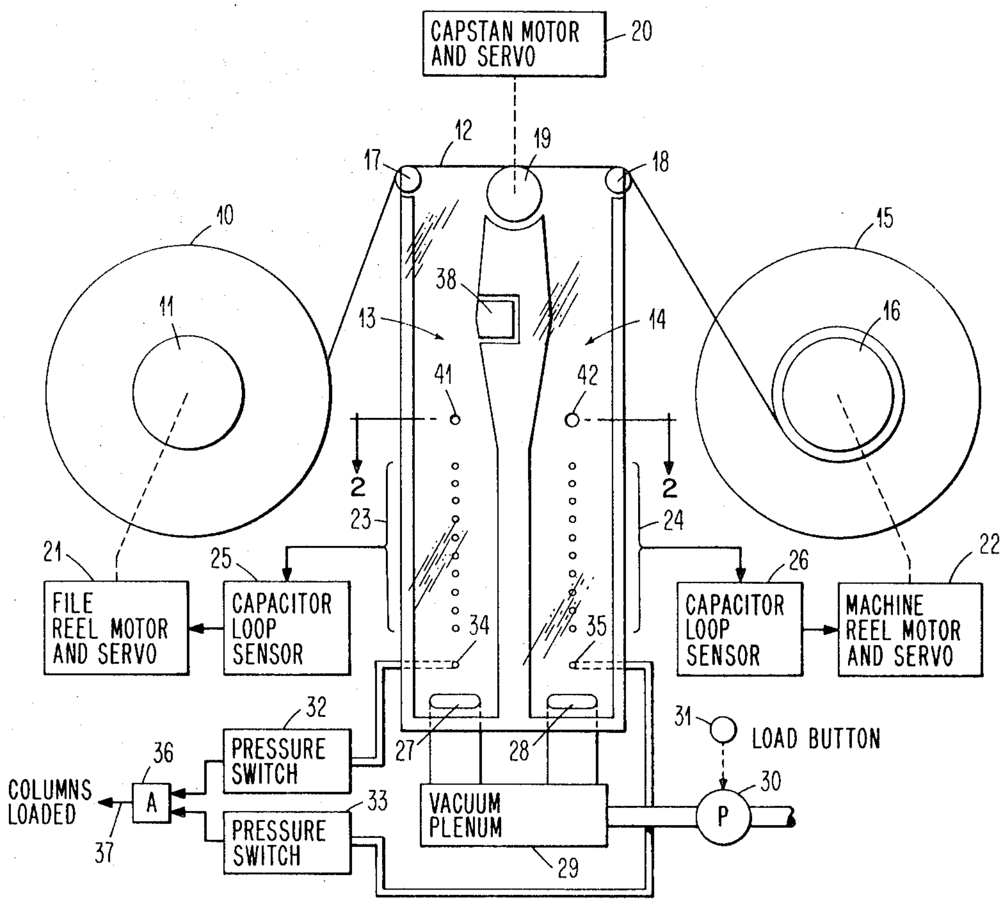
FIG. 1 is a diagrammatic view of a portion of a magnetic tape unit utilizing a species of the invention having unequal size holes to atmosphere to provide the required air leakage.

Referring to FIG. 1, a diagrammatic view of a portion of a magnetic tape unit is shown wherein file reel 10 has been loaded on drive hub 11 and magnetic tape 12 has been manually threaded through a tape path means, across the open top of file vacuum column 13 and machine vacuum column 14. The end of tape has been wrapped a few turns around machine reel 15, this reel having a central hub 16 and a single lower flange. At the portion of the two vacuum columns adjacent a reel, idle rollers 17 and 18 support the tape. Intermediate the vacuum columns, the tape engages a capstan 19.

This capstan 19 continuously engages the tape, as by a rubber-like friction surface. The capstan is bidirectionally driven under the control of a capstan motor and an associated motor control servomechanism 20. The capstan motor is directly connected to capstan 19 and the motor servomechanism can take many forms, as is apparent to those skilled in the art. At this time, capstan 19 is free to turn as the tape moves during subsequent loading of the columns.

File reel 10 is connected to be driven by file reel motor and servomechanism 21, whereas machine reel 15 is connected to be bidirectionally driven by machine reel motor and servomechanism 22. The operational zone for each vacuum column is identified by brackets 23 and 24, respectively. These brackets are diagrammatic showings of loop position sensors, such as capacitor loop sensors 25 and 26. Such a capacitor loop position sensor is shown in U. S. Pat. No. 3,122,332. The motors and servos 21 and 22 function to maintain the tape loops in operational zones 23 and 24.

Each of the vacuum columns includes vacuum ports 27 and 28 which are connected to a common vacuum plenum chamber 29. Plenum chamber 29 is evacuated by pump 30 whenever this pump is energized, as for example, by means of manual load button 31.

Each of the vacuum columns also includes vacuum sensitive detectors in the form of pressure switches 32 and 33 which are connected to ports 34 and 35. These two ports are located near the bottom closed end of the two vacuum columns and in a position above vacuum ports 27 and 28, respectively. The presence of vacuum under the loop bight indicates that a loop of tape has been successfully loaded into a vacuum column. When both of the switches 32 and 33 indicate successful loading, an AND gate 36 provides an output on conductor 37 indicating that the vacuum columns have been loaded.

Figure 3:
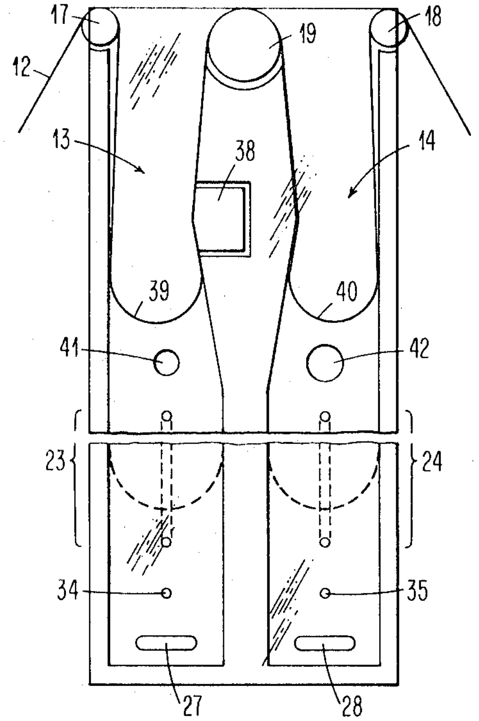

The construction and arrangement of vacuum columns 13 and 14 provide inherent dissimilar tape loading characteristics. Vacuum column 13 includes a tape processing station 38 located at the upper portion of that column in the narrow side wall thereof. Referring to FIG. 3, this figure shows a loop of tape being loaded into the two columns 13 and 14, as the loop travels down the column toward the operational zones 23 and 24. As the loop 39 in the file vacuum column travels down the column toward the operational zone 23, the loop engages the tape processing station 38 and the loop breaks away from the side wall of the vacuum column causing air to leak past the loop bight and into the lower part of the vacuum column. However, the loop 40 which is being loaded into vacuum column 14 remains sealed to the column and very little, if any, leakage occurs past the loop to the bottom of that column.

The structure thus far provided would inherently produce a loading of loop 40 into column 14, causing this loop to bottom in that column before loop 39 could be loaded into column 13.

In accordance with the present invention, unique air leakage means is provided to equalize the loading characteristics of the vacuum columns, to cause the columns to concurrently load.

Figure 2:
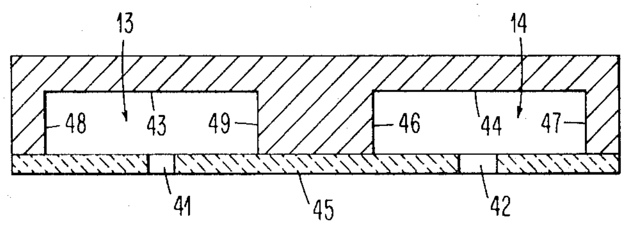
FIG. 2 is a section view of the vacuum columns of FIG. 1, taken along the line 2—2, FIG. 3 discloses the vacuum columns of FIG. 1, with the tape shown in three positions, namely, prior to loading, during loading and after loading has been completed, FIGS. 4, 5 and 6 disclose another species of the invention where internal grooves of unequal cross-section provide the required air leakage, and FIGS. 7, 8 and 9 disclose another species of the invention where internally tapered vacuum column walls of unequal taper provide the required air leakage.

Specifically, in the embodiment of FIG. 1, two unequal-size openings or paths 41 and 42 to atmosphere are provided in the front wall of the vacuum columns. Referring to FIG. 2, the relatively wide back walls of the two vacuum columns are formed by surfaces 43 and 44. The width of these walls determines the width of the loop bight. The front wide walls of the vacuum columns are formed by a single member 45, such as a transparent door. This door carries the two openings 41 and 42. The narrow side walls 46, 47, 48 and 49 of the vacuum columns are substantially equal in dimension to the width of the tape 12, and may for example be one-half inch.

Referring again to FIG. 3, and particularly considering the transient period when the tape loops 39 and 40 are in the solid line positions, it will be seen that the air flow to vacuum port 27 consists of two components. The first component is that which flows through opening 41. The second component is the leakage which occurs around the loop as it passes tape processing station 38. Considering vacuum column 14, basically only a single component of air flow occurs to vacuum port 28 at this time, this being the flow through opening 42. The construction and arrangement of the present invention provides that the total air flow to vacuum ports 27 and 28 is substantially equal, thus producing substantially equal loading force for the two tape loops 39 and 40, causing them to concurrently load to the eventual operational position within operational zones 23 and 24, these positions being shown by the dotted line positions of these two tape loops.

As has been noted, pressure switches 32 and 33 (FIG. 1) are operable to indicate that a tape loop has been successfully loaded in each of the columns and that data processing may now proceed. The construction and arrangement of the air leakage means of the present invention also insures that these switches will not transfer, to indicate successful loading, until the tape loops 29 and 40 have penetrated the vacuum columns 13 and 14 sufficiently to place the openings 41 and 42 above the tape loops. Thus, cycling operation of one or both of these switches during loading of the columns is prevented.

Within the teachings of the present invention, the unequal size openings to atmosphere 41 and 42 are broadly defined as air leakage means, fluid flow means, and paths to atmosphere. This means may take many forms, the essence of the present invention providing such a means constructed and arranged to equalize the loading characteristics of the columns.

Figure 4:
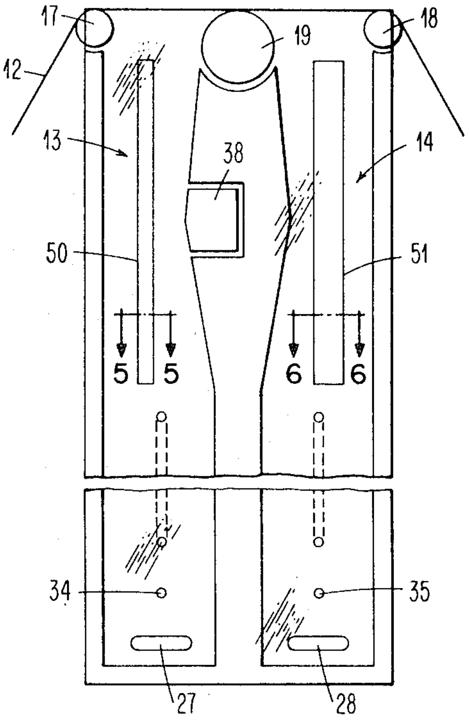
Figure 5:
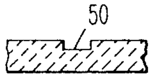
Figure 6:
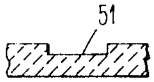

In FIGS. 4, 5 and 6, the two vacuum columns 13 and 14 are provided with an air leakage means in the form of two internal channels or grooves 50 and 51. The channels 50 and 51 are disposed on the internal surface of the front wall of the vacuum column and are formed of different cross sections to again selectively control the air leakage past the tape loops as they are loaded into these two columns into the operational zones 23 and 24.

Figure 7:
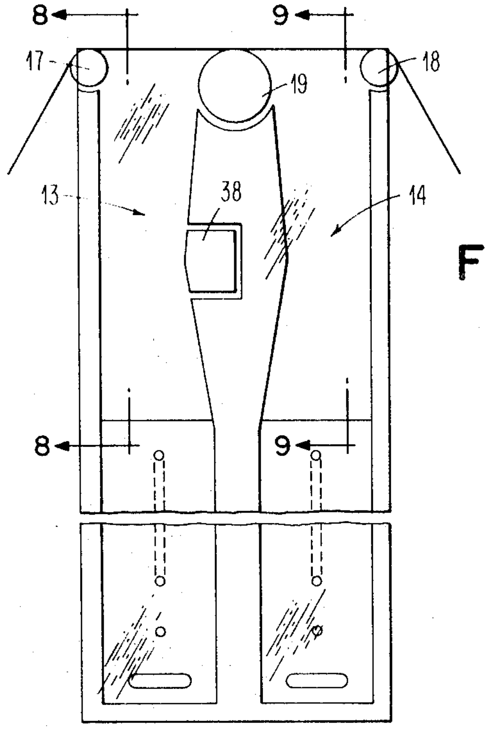
Figure 8:
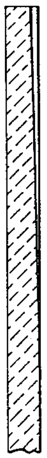
Figure 9:

FIGS. 7, 8 and 9 show a further embodiment of the present invention wherein the air leakage means constitutes a full tapered front wall for the two vacuum columns 13 and 14. In this arrangement, the taper of the front wall of vacuum column 14 is greater than the taper of the front wall of vacuum column 13, thus providing the unequal air flow past the loop of tape as these loops are loaded into the two columns. Again, this tapered wall exists only in the loading portion of the vacuum column, above the operational zones 23 and 24.

While the invention has been particularly shown and described with reference to preferred embodiments thereof, it will be understood by those skilled in the art that various changes in form and details may be made therein without departing from the scope of the invention.

What is claimed is:

1. In a web transport having two vacuum columns, each of which is adapted to hold a web loop therein under vacuum force as the web travels along a path, each of said columns having a loop receiving opening and a first zone adjacent thereto through which the loop bight temporarily passes as the loop is loaded into the column to an operational zone where the loop bight is maintained during subsequent travel of the web, and wherein the first zones of said columns have dissimilar loop loading characteristics by virtue of dissimilar fluid leakage which occurs around the loop bight as it passes through said first zone, the improvement comprising;

fluid flow leakage means associated with at least that one of said columns having the least leakage, to control the fluid leakage around said loop bight to ambient pressure as said loop bight passes through said first zone, said flow means being constructed and arranged to complement the dissimilar loop loading characteristics of said columns and thereby render them similar.

2. A web transport as defined in claim 1 including vacuum sensing means associated with each of said columns and operable to sense a given vacuum level indicative of the presence of said loop bight in said operational zone, and fluid flow leakage means associated with each of said two columns to additionally prevent the sensing of said given vacuum level while the loop bight is passing through said first zone.

3. A web transport as defined in claim 2 including a web processing station positioned in said first zone of one of said two columns, wherein the fluid flow means associated with said one column allows a lesser flow to the intermediate zone thereof than the fluid flow means associated with the other column allows to the intermediate zone of that column.

4. A web transport as defined in claim 3 wherein said fluid flow means includes means connecting an area intermediate said first zone and said operational zone to ambient pressure.

5. A magnetic tape unit, comprising;

a pair of vacuum column tape buffers; each of said columns having an open end, a closed end, an operational zone adjacent said closed end and dissimilar loading zones adjacent said open end, tape path means adapted to receive and support a length of tape across the open end of each of said columns prior to the vacuum loading of a loop of tape into each of said columns, vacuum source means associated with the closed end of each of said columns and adapted to be activated after tape is positioned in said tape path means, and air leakage means associated with the loading zone of at least one of said pair of vacuum columns, said air leakage means being constructed and arranged to control the leakage of air past the loop of tape in said one column as the loop passes through said loading zone, and to maintain substantially equal vacuum loading force on each of said loops to thereby concurrently load said columns.

6. A magnetic tape unit as defined in claim 5, wherein said tape path means includes a capstan disposed between said pair of columns, said capstan being free to turn during loading of said columns.

7. A magnetic tape unit as defined in claim 6, wherein the other of said columns includes a tape processing station disposed in the loading zone thereof.

8. A magnetic tape unit as defined in claim 7, wherein each of said columns includes a vacuum sensitive detector located between said operational zone and said vacuum source means and operable to sense a given vacuum level, and including air leakage means associated with each of said vacuum columns, said air leakage means being constructed and arranged to prevent the sensing of said given vacuum level by said detectors until such time as the loop of tape in each column has been loaded into said operational zone.

9. A magnetic tape unit as defined in claim 8, wherein said tape processing station is located adjacent a narrow side wall of said other column, and wherein said air leakage means comprises unequal size paths to atmosphere to control air flow past the tape loop as the loop passes through said loading zone.

10. A magnetic tape unit as defined in claim 9, wherein said unequal size paths include unequal size holes formed in the broad walls of each of said columns at the interface of said loading zone and said operational zone.

11. A magnetic tape unit as defined in claim 9, wherein said unequal size paths include unequal size internal grooves formed in the broad walls of each of said columns, said grooves extending through said loading zone and terminating at the interface of said loading zone and said operational zone.

12. A magnetic tape unit as defined in claim 9, including loop detecting means associated in the operational zone of each of said columns, and servo means controlled by said loop detecting means and effective to maintain the loop of tape in the operational zone of each column.

* * * * *